G. STURGESS.
FLYING MACHINE.
APPLICATION FILED APR. 25, 1910.

1,049,280.

Patented Dec. 31, 1912.
2 SHEETS—SHEET 1.

Witnesses
E. Heymann
E. Schallinger

Inventor
George Sturgess.
per B. Singer
Attorney

G. STURGESS.
FLYING MACHINE.
APPLICATION FILED APR. 25, 1910.
1,049,280.
Patented Dec. 31, 1912.
2 SHEETS—SHEET 2.
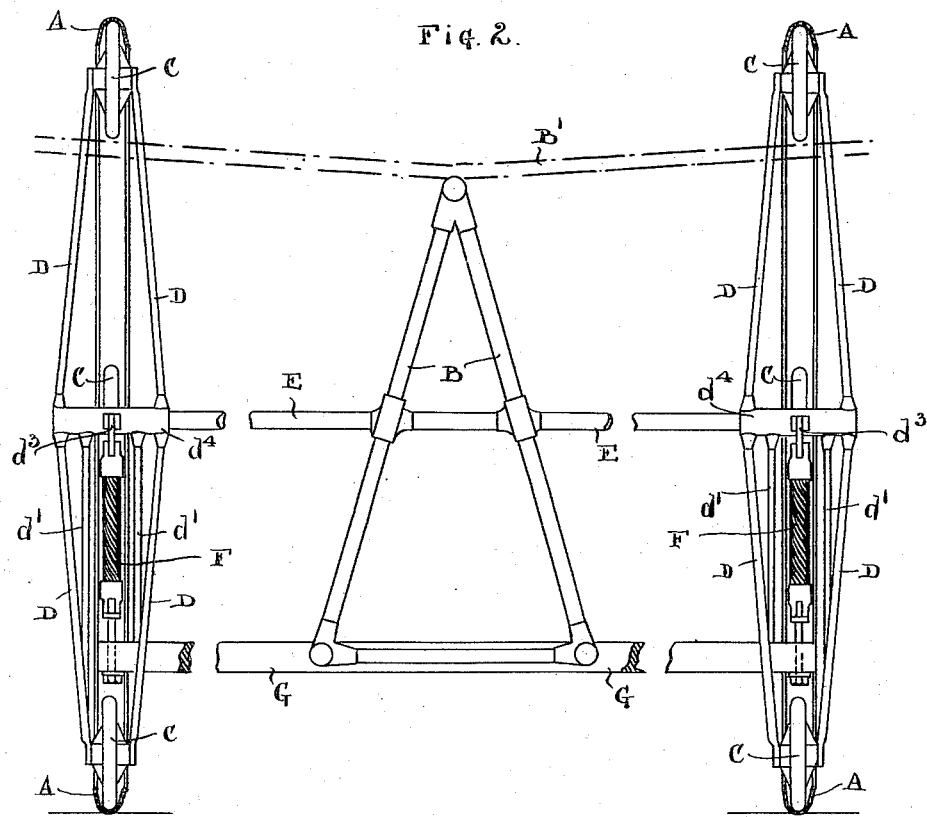
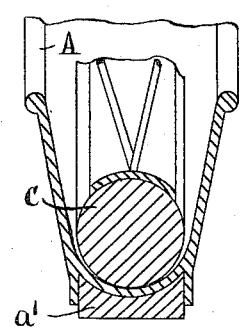
Witnesses
C. Heymann
E. Schallinger
Inventor.
George Sturgess.
per B. Singer
Attorney

UNITED STATES PATENT OFFICE.

GEORGE STURGESS, OF NEWQUAYS, MABLETHORPE, ENGLAND.

FLYING-MACHINE.

1,049,280.  Specification of Letters Patent.  Patented Dec. 31, 1912.

Application filed April 25, 1910. Serial No. 557,524.

*To all whom it may concern:*

Be it known that I, GEORGE STURGESS, a subject of the King of Great Britain and Ireland, residing at Newquays, Mablethorpe, Lincolnshire, England, but whose post-office address is at Leicester, Leicestershire, England, have invented certain new and useful Improvements in Flying-Machines, of which the following is a specification.
This invention relates to improvements in the construction of flying machines which enable them to run with ease on the ground or on ordinary roads when not flying.

I provide a large road wheel or rim encircling or partly encircling the apparatus and arranged to meet the ground when the machine descends and to travel upon it in such a manner that the machine may be used upon an ordinary road and may start on its flight whenever desired. The rim, usually a double one, is mounted to rotate upon a series of supporting rollers or wheels, carried by a strong frame preferably pivoted near the front and having a spring attachment, so that the rim rests upon resilient supports which absorb any shock. This double rim may be applied to the body of existing flying machines, and may encircle the plane or planes or may project at its upper edge through a plane, or in the case of a monoplane it may be situated entirely below the plane.

In order that my invention may be more readily understood, reference is had to the accompanying sheets of drawings in which—

Figure 1:
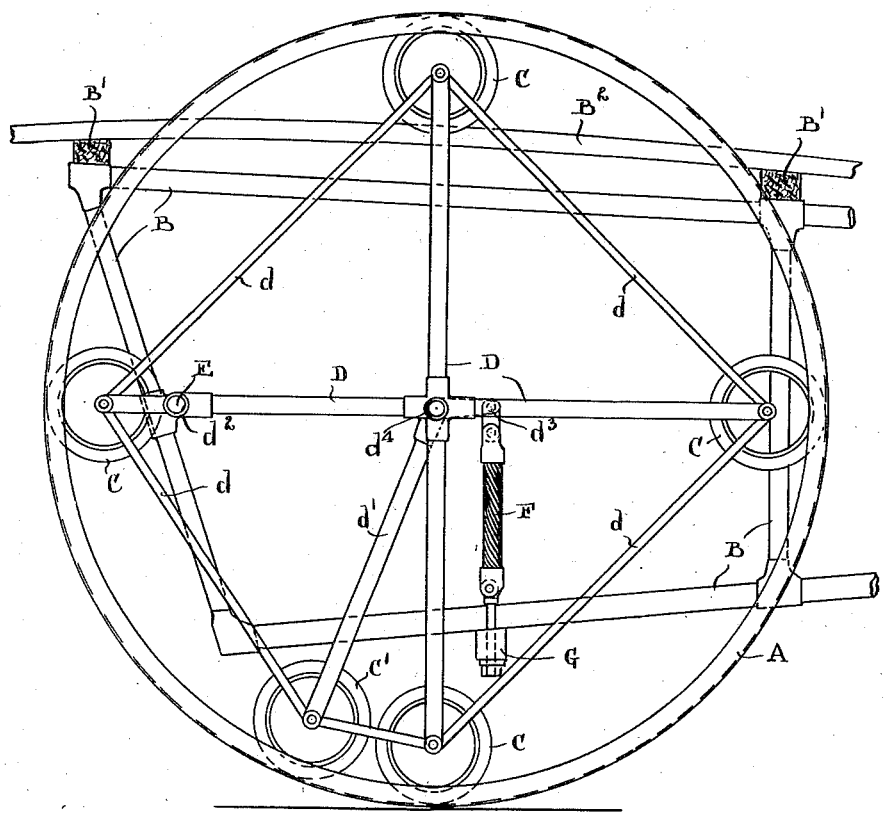
Figure 3:
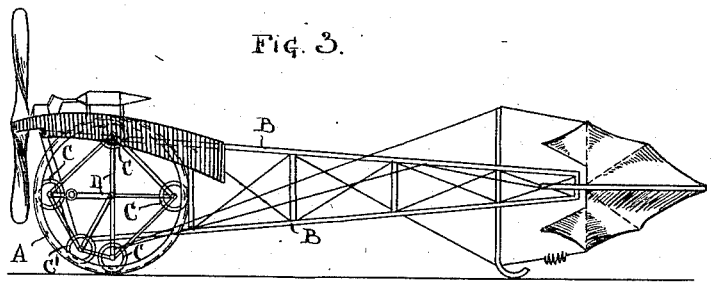

Figure 1 is a side elevation and Fig. 2 a rear elevation partly in section of part of an aeroplane with my double road rim applied:
Fig. 3 is a side elevation to a small scale of a complete monoplane showing diagrammatically the application of the road rim; and Figs. 4 and 5 are sections of two forms of rim with the supporting rollers.
A is the deeply channeled road rim, a pair being shown in Fig. 2, placed on either side of the frame B of the aeroplane to give a wide wheel base. The rim is preferably provided with the solid rubber tire $a$ or $a^1$, shown in Figs. 4 and 5 of the drawings, but the tread of the rim may be of any suitable type. The channel must be of sufficient depth to give the necessary rigidity to the rim without requiring excessive weight.

The rim is mounted to rotate freely upon the rollers C which turn on ball bearings at the corners of a strong frame, shown of approximately square form and consisting of the radial arms D with connecting bars $d$ forming the sides of the frame. At the lower part of the frame an additional radial arm $d^1$ is provided, supporting directly the special roller $C^1$ placed a little in front of the bottom roller and at such an angle that, when the flying machine alights on the ground, the supporting rollers $C^1$ will directly receive the pressure on the rim, preventing any danger of buckling. The angle between the two bottom radial arms is set to suit the gliding angle of the flying machine.

The supporting frame is mounted to turn about a fulcrum at $d^2$ close to the front of the main frame B of the machine, a cross tube E, as shown in Fig. 2, extending across the front of the frame to carry the roller frame at each end.

To give the necessary resiliency to the roller frame a spring device is employed consisting, in the form illustrated, of a strong spring F, which may be of stranded rubber or metal, attached at its lower end to the cross bar G fixed across the bottom of the main frame and, at its upper end, to an extension $d^3$ from the hub $d^4$ of the roller frame. A suitable stop may be provided to prevent the roller frame and rim rising beyond a certain distance.

The rim is shown in the drawings as applied to a monoplane of which the main spars are shown at $B^1$ and the rib of the plane at $B^2$. In this case the plane is cut to allow the upper edge of the rim A and the supporting frame to project through but, in the case of a very large rim, the plane or planes may be entirely encircled by the rim.

With a large road rim of the type described a flying machine can start from or alight upon rough ground or an ordinary road and can be arranged to travel upon such ground without difficulty. As in descending, even at a considerable angle, the rim will be the first point to strike the ground the danger of accident is greatly reduced. The double rim is the one preferably employed but with expert pilots a single central rim may be sufficient, reducing the cost of the apparatus.

What I claim as my invention and desire to secure by Letters Patent is:—

1. In a flying machine, a large road rim, a supporting frame flexibly mounted on the main frame, and rollers on the supporting frame to carry the rolling road rim.

2. In a flying machine, a large road rim, a spring controlled supporting frame with radial arms mounted to turn upon the main frame of the machine, and rollers at the corners of the said frame, the frame having an auxiliary arm and roller set forward of the bottom roller to receive the shock on meeting the ground.

3. In a flying machine, a large road rim, a frame within the rim pivoted upon the main frame of the machine on an axis lying within the rim at the front, rollers on the frame carrying the road rim, and a spring connecting the pivoted frame to the main frame.

4. In a flying machine, two large road rims, one on each side of the main frame of the machine and having a common axis, a supporting frame within each rim, a horizontal cross arm on the front of the main frame, on the ends of which the supporting frame is mounted to turn, and spring connections from the two pivoted frames to the main frame.

In witness whereof I have hereunto set my hand in the presence of two witnesses.

GEORGE STURGESS.

Witnesses:
WALTER W. BALL,
F. HOOD.